Aug. 31, 1965     E. C. CARTER ETAL     3,203,501
AUTOMOTIVE SPEED CONTROL SYSTEM
Filed May 3, 1963     4 Sheets-Sheet 1
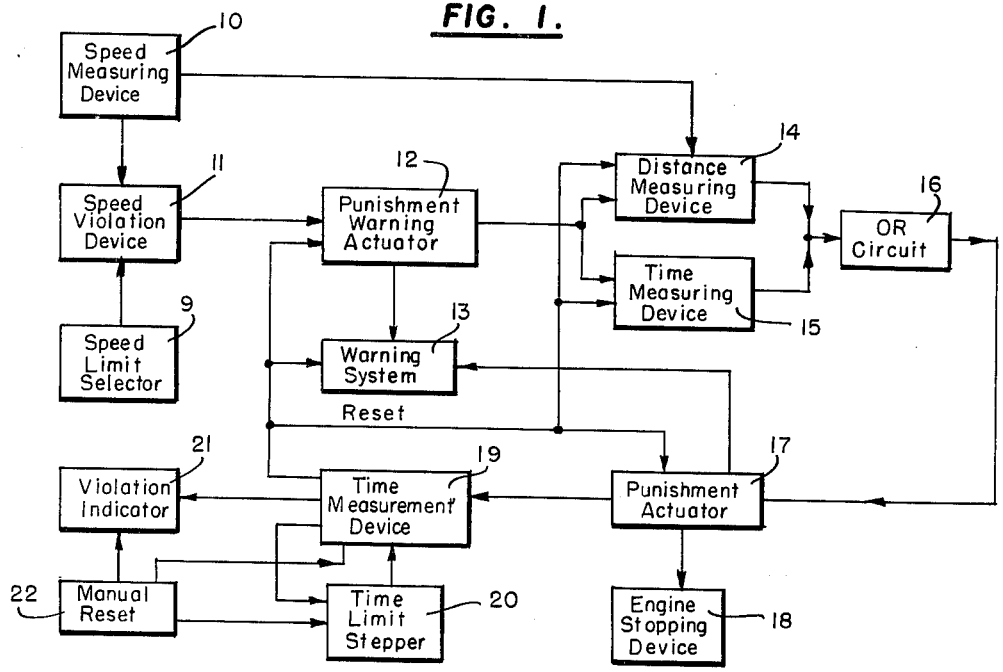
FIG. 1.
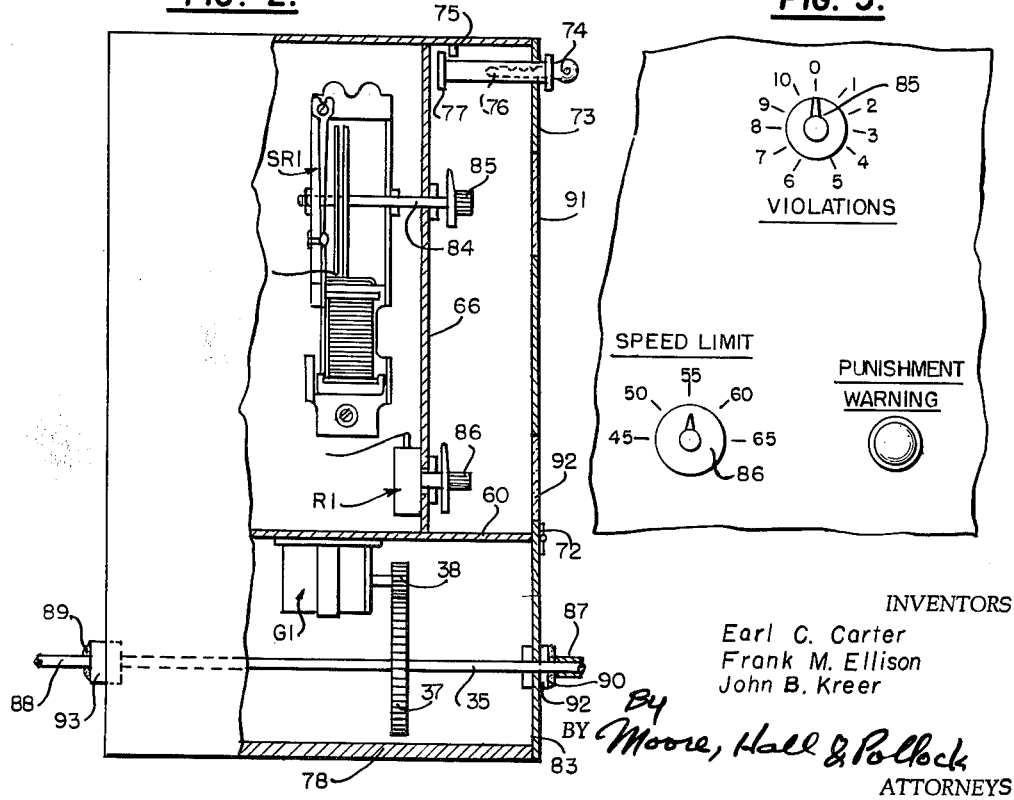
FIG. 2.
FIG. 3.
INVENTORS
Earl C. Carter
Frank M. Ellison
John B. Kreer
BY Moore, Hall & Pollock
ATTORNEYS Aug. 31, 1965    E. C. CARTER ETAL    3,203,501
AUTOMOTIVE SPEED CONTROL SYSTEM
Filed May 3, 1963    4 Sheets-Sheet 2

INVENTORS
Earl C. Carter
Frank M. Ellison
John B. Kreer

BY *Moore, Hall & Pollock*
ATTORNEYS

Aug. 31, 1965   E. C. CARTER ETAL   3,203,501
AUTOMOTIVE SPEED CONTROL SYSTEM
Filed May 3, 1963   4 Sheets-Sheet 3

INVENTORS
Earl C. Carter
Frank M. Ellison
John B. Kreer

BY Moore, Hall & Pollock
ATTORNEYS

Aug. 31, 1965    E. C. CARTER ETAL    3,203,501
AUTOMOTIVE SPEED CONTROL SYSTEM
Filed May 3, 1963    4 Sheets-Sheet 4

INVENTORS
Earl C. Carter
Frank M. Ellison
John B. Kreer

BY Moore, Hall & Pollock
ATTORNEYS

United States Patent Office 3,203,501
Patented Aug. 31, 1965

3,203,501
AUTOMOTIVE SPEED CONTROL SYSTEM
Earl C. Carter, Charleston, Frank M. Ellison, South Charleston, and John B. Kreer, Morgantown, W. Va., assignors, by direct and mesne assignments, to Ell-Car Automatic Speed Control Systems, Inc., Charleston, W. Va., a corporation of West Virginia
Filed May 3, 1963, Ser. No. 277,878
19 Claims. (Cl. 180—82.1)

This invention relates to a system which when installed in an automobile will punish the driver for exceeding a preset speed limit.

It is the general object of the invention to aid parents and law enforcement officials in controlling the maximum speed that the family automobile is driven by teen age children.

A warning system warns the driver that the speed limit has been exceeded and that a safe stopping place should be sought by the driver. The warning system provides both audible and visual warning signals. Provision is also made to allow the driver to move the automobile to a safe place to stop before the engine is stopped. The system embodying the invention, also stops the automobile for periods of time which increase in length with each time the speed limit set by the parents is violated.

The system accomplishes its objective by devices which measure the speed of the automobile and compares it to the preset speed limit. Whenever a speed violation occurs, the comparison device actuates the warning system, and starts devices which measure distance travelled and time elapsed since the speed limit was violated. When either the time elapsed or the distances travelled reach set values, the system shuts off the engine of the automobile and starts a device which measures the time elapsed since the engine stopped. Whenever the proper time has elapsed, the system allows the engine to be restarted, resets the time and distance measuring devices, increases the time limit that the engine will be stopped on the next violation, actuates an indicator to show that a violation has taken place, and provides the driver with a visual signal that the engine may be restarted. A manual reset control is provided which allows the violation indicator to be reset back to zero and also sets the time which the engine is stopped back to the minimum time interval. The manual reset control and the control which sets the speed limit are contained in a locked box. If that part of the system which shuts off the engine fails to function, an indicator will nevertheless show that a violation has occurred and the violation indicator will register as many as ten violations. All interconnections of devices in the system which are external to this box are spot welded. This latter precaution, while not making it impossible for the driver to render the system inoperative, will make it obvious to the parent that the system has been tampered with.

In an alternate form of the system, only time since the speed violation has occurred is measured, but the time which the driver is allowed before the engine is stopped is reduced if the driver persists in exceeding the preset speed limit.

The invention will be readily understood from the following description taken together with the accompanying drawings in which:

FIG. 1 is a block diagram which describes the system in its various embodiments;

FIG. 2 is a cutaway view of the locked box showing the mechanical parts of the system and the interconnection of the system with the speedometer cable of the automobile;

FIG. 3 is a view of the indicator panel showing the indicator displays of the system and the speed limit set and manual reset controls;

Figure 4:
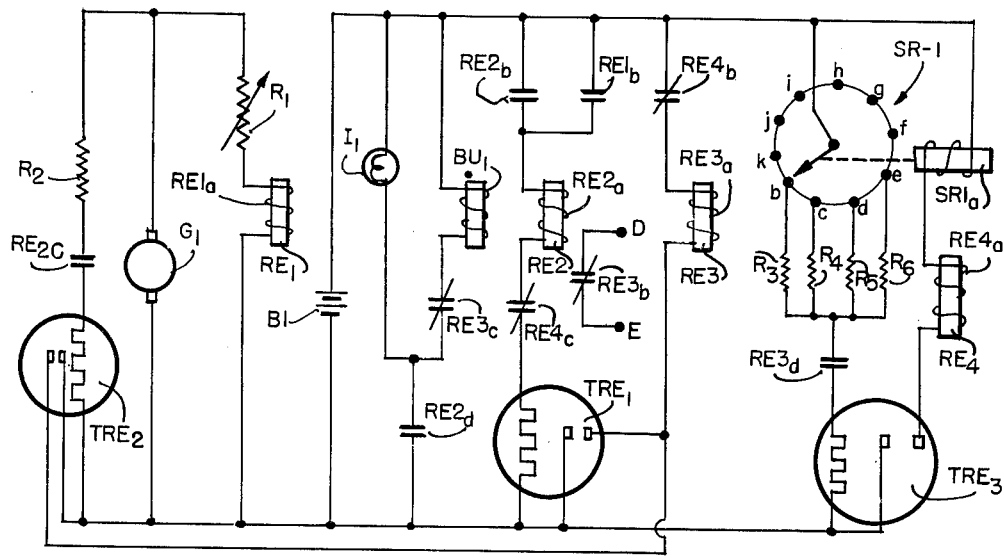
FIG. 4 is an electrical circuit diagram of the first form of the invention.

The function of each device in the system can be understood from a consideration of FIG. 1. The speed measurement device 10 supplies a measure of the speed of the automobile to the speed violation detector 11 and the distance measuring device 14. The speed violation detector 11 compares this measure of the automobile speed with the speed limit indication from the speed limit selector 9. Whenever the speed violation detector 11 finds that the speed limit has been violated, it turns on the punishment warning actuator 12. The punishment warning actuator 12 turns on the warning system 13. At the same time the punishment warning actuator 12 starts the distance measuring device 14 and the time measuring device 15. When either of these devices reaches its design limit, it supplies an electrical pulse to the OR circuit 16. The OR circuit 16 supplies an electrical pulse to the punishment actuator 17 whenever it receives an electrical pulse from either the time measuring device 15 or the distance measuring device 14. When the punishment actuator 17 receives this pulse, it turns on the engine stopping device 18 and the time measuring device 19, and turns off the audible warning system signal. When the time measuring device 19 reaches its limit, it sends reset signals to the distance measuring device 14, the time measuring device 15, and sends a signal to the punishment actuator 17 which causes the punishment actuator 17 to turn off the engine stopping device 18 so that the engine may be restarted. In addition, the time measuring device 19 supplies a signal to the time limit stepper 20 which modifies the time measuring device 19 so that it will take longer for the time measuring device 19 to yield an output signal the next time it is started because of a speed violation. The time measuring device 19 also supplies a signal to the warning system 13 which turns off the visual warning signal, thereby informing the driver that the punishment cycle is over and that the engine may be restarted.

FIG. 2 shows a possible embodiment of the speed limit selector 9, the speed measuring device 10, the time limit stepper 20, and the manual reset 22. It also shows the manner in which the system would be interconnected with the speedometer system of the automobile. Cable 87 is the cable which ordinarily connects the transmission of the automobile and the speedometer. When the speed control system is installed in an automobile, instead of attaching cable 87 to the speedometer head, it is attached to connector 92 and secured there by spot weld 90. A similar cable 88 is then connected between the speedometer head and connector 93 and secured by spot weld 89. The rotary motion of cable 87 is coupled through the box by shaft 35, so that the operation of the automobile speedometer is left unaffected. The speed of shaft 35 is coupled through gears 37 and 38 to tachometer G1, essentially a small permanent magnet D.C. generator. The output voltage of G1 would thus be proportional to the speed of the automobile.

As can be seen in FIG. 4, the generator voltage would cause a current to pass through variable resistor R1 and coil RE1a of relay RE1. Resistor R1 would be set so that the current required to operate relay RE1 would just be reached as the speed limit was exceeded. Thus R1 and RE1 would constitute the speed violation detector 11. When RE1 operates, contacts RE1b would close, allowing current from the automobile battery to pass through the coil RE2a of relay RE2. This current would be large enough to operate RE2, closing contacts RE2b, RE2c, and RE2d. Contact RE2b short circuits contacts RE1b so that RE2 remains closed after RE1 deenergizes until the end of the punishment cycle. Contact RE2d causes current to pass through buzzer BU1 and light bulb I1. The buzzer BU1 and light bulb I1 provide the audible and visual signals, respectively, of warning system 13. RE2 constitutes the punishment warning actuator 12. Whenever RE2 is energized, a steady current will pass through thermal relay TRE1 and a current proportional to the speed of the automobile will pass through thermal relay TRE2. Since TRE1 is receiving a constant current, it will operate at a fixed amount of time after the speed limit has been exceeded. Therefore it constitutes time measuring device 15. Since the current through TRE2 is proportional to the speed of the automobile, it will operate after the automobile has travelled a fixed distance after the speed limit has been exceeded. Therefore TRE2 constitutes distance measuring device 14. The parallel connection of the contacts of TRE1 and TRE2 constitute OR circuit 16. Whenever either TRE1 or TRE2 operate, current will pass through coil RE3a of RE3, causing contacts RE3b and RE3c to open and RE3d to close. Terminals D and E are connected in series with the ignition system of the automobile. When contacts RE3b open, the ignition circuit of the automobile will be interrupted, and the engine will stop. Thus it can be seen that RE3 is the punishment actuator 17, and RE3b is the engine stopping device 18 for this embodiment of the system. When contacts RE3c open, the buzzer BU1 will be turned off, thus removing the audible signal of warning system 13. When contacts RE3d are closed, current will pass through thermal relay TRE3. The amount of current will depend on the position of stepping relay SR1. Resistors R3, R4, R5 and R6 have successively larger values, so that as the wiper of SR1 is advanced, the current which passes through TRE3 will become successively less. The amount of this current will determine the time it takes TRE3 to operate. The terminals on SR1 after the fourth terminal are all short circuited to the fourth terminal so that after the fourth violation the current which passes through TRE3 will remain at the same value as it has on the fourth violation. The time delay in the operation of TRE3 will thus increase after each of the first three violations and will remain the same after the fourth violation. SR1 (violation indicator 21, FIG. 1) will indicate as many as ten violations even if the engine stopping device 18 fails to function.

When TRE3 operates, its contacts will cause current to flow through the coil RE4a of relay RE4 and coil SR1a of stepping relay SR1. The combination of resistors R3, R4, R5, and R6 and thermal relay TRE3 constitute the measuring device 19. The stepping relay SR1 constitutes the time limit stepper 20. When RE4 operates, it causes contacts RE4b and RE4c to open. This will interrupt the current in the coils of RE2 and RE3, and they will be deenergized. This in turn will restore the ignition current of the automobile, and interrupt the current in TRE1, TRE2, and TRE3, causing their contacts to open. Thus it can be seen that RE4 performs the reset operations indicated in the block diagram of FIG. 1.

Shaft 84 of SR1 shown in FIG. 2 extends through panel 66. Knob 85 is attached to shaft 84, and the direction of the pointer on knob 85 points to numbers painted on panel 66 corresponding to the position of the wipers on SR1 as shown in FIG. 3. Thus stepping relay SR1, panel 66, and knob 85 constitute the violation indicator 21. The stepping relay can be advanced to its initial position by turning knob 85, so that knob 85 constitutes the manual reset 22. As described in the operation of the circuit, the value of R1 determines the speed at which the speed violation detector operates so that R1, knob 86, and panel 66 constitute the speed limit selector 9. In order to have access to knobs 85 and 86, a person must have key 74 to turn lock 76 so that panel 73 may be lowered about hinge 72. When panel 73 is locked in the position shown in FIG. 2, the selected speed limit, the visual warning signal, and the number of violations can be viewed through windows 91 and 92. Alternately, the punishment warning visual lamp may be located on the dashboard of the car.

In summary, the device of FIG. 4 includes a relay RE1 that produces a first signal (by closing its relay contacts) that energizes relay RE2 and delay device TRE2. The delay device TRE2 produces a second signal after a period of time which is inversely related to the speed of the car. After relay RE2 is closed delay device TRE1 produces a third signal after a predetermined time period independent of the speed of the car. Relay RE3 is actuated by the second or third signal whichever occurs first, and stops the engine (through contacts RE3b) and produces a fourth signal which actuates time delay device TRE3 which, after a further period of delay, restores the device to normal and advances the stepping relay. Advancement of the stepping relay SR1 increases the delay period of relay TR3 after the next violation.

It is, of course, obvious that the cost of the device constituting this invention may be reduced by omitting the stepping relay SR1 together with its actuating coil SR1a. This can be done simply by short-circuiting the coil SR1a and also by connecting the wire to the movable arm of the relay directly to the upper contact of relay RE3d. Omission of the stepping relay would result in the apparatus restoring to normal after each shut-down in a predetermined time period instead of successively increasing time periods, as described above.

Figure 5:
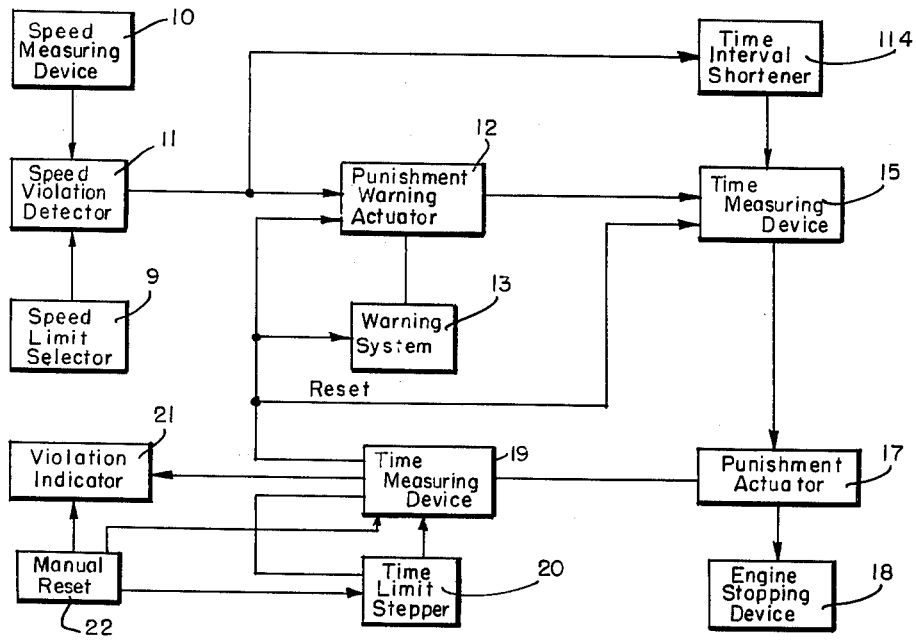
FIG. 5 is a block diagram of the second form of the invention.

The second form of the invention can readily be understood from inspection of the block diagram in FIG. 5. It should be noted that this block diagram differs from the block diagram in FIG. 1 in that the distance measuring device 14 has been replaced by the time interval shortener 114, and OR circuit 16 has been eliminated. The purpose of having distance measuring device 14 in the first form of the invention was to discourage the driver from speeding during the time interval between the occurrence of the speed limit violation and the stopping of the engine. In the second form of the invention, the driver is discouraged from speeding during this time interval by the knowledge that continued violation of the speed limit will cause the engine to be stopped sooner than it would be if the speed limit is obeyed, or possibly not at all.

Figure 6:
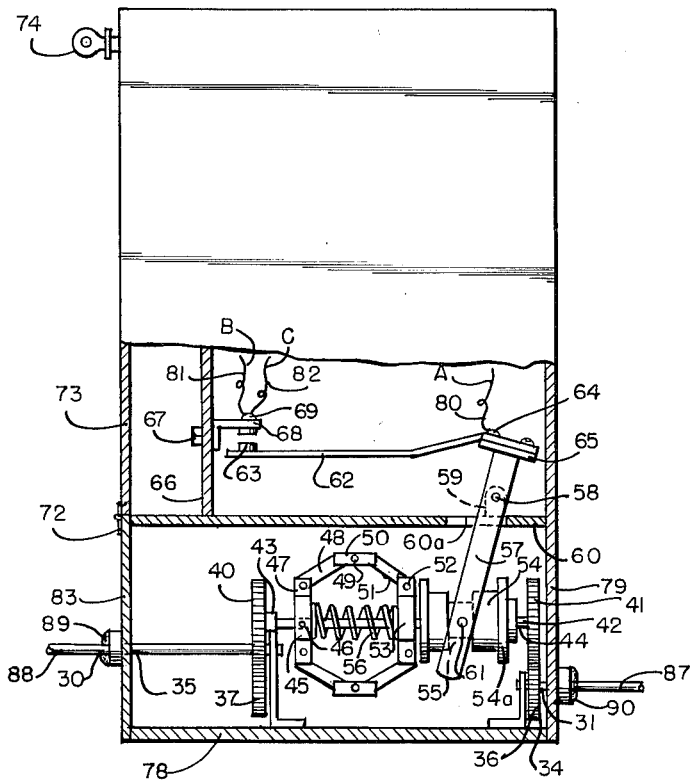
FIG. 6 is a cutaway view of the locked box showing an alternate form of the violation detector which may be used with the second form of the invention.

In the second form of the invention, the speed violation detector 11 and speed measuring device 10 would take the form shown in FIG. 6. 78 indicates a base and 79 and 83 indicate two sides of a frame structure which include projecting bosses 30 and 31. These bosses are tubular and the speedometer drive 87 protecting sheathing has threaded connection with one of the threaded portions of bosses 30 and 31 and the sheathing of that portion of the drive 88 leading to the speedometer head has threaded connection with the other threaded portion.

The shaft portion of the drive has the usual tongue and groove connection within this threaded portion and with the shaft that extends into the housing defined by the frame members last mentioned. These connections are further secured by spot welds 89 and 90.

Herein two shafts 34 and 35 are illustrated which have secured thereto the gears 36 and 37, respectively, and said gears mesh with the pinions 40 and 41, respectively, secured as at 42 and 43, respectively, to the shaft 44.

A sleeve 45 is secured suitably to the shaft 44 as at 46 and includes a plurality of outwardly extending ears 47 which are pivotally connected to link means 48, in turn pivotally connected at 49 to weights 50. Also pivotally connected at 49 to the weights 50 are oppositely arranged link means 51, in turn pivotally connected at 52 to a sliding collar 53 rigid with which is the grooved collar portion 54 having the groove 55 therein. A spring 56 is concentric with the shaft 44 between the two collars 45 and 53 and normally tends to maintain the respective pairs of links 48 and 51 in aligned position.

A pair of lever members 57 is pivotally supported at 58 in ears 59 carried by the upper base member 60 of the frame, said lever extending through the aperture 60a beneath the ears and between the same. Extending inwardly toward each other from each of the arms is a pin 61 that rides in the groove 55.

As the power portion of the speedometer drive is rotated in response to the automobile speed, the shaft 44 is rotated in proportion thereto and the weights 50 and links 48 and 49 are subjected to centrifugal force. The tendency of these parts to move outwardly away from the shaft at the weight, or flyball, connections is resisted by the spring 56 at the predetermined speed for which the spring tension is adjusted, which adjustment may be provided between the portion 54a and the collar 53 or at any other portion of the device, since the aforesaid constitutes a centrifugal governor commonly known as the phonograph governor mechanism. When the speed is that for which the centrifugal force in opposition to the spring load, howsoever adjusted, moves the weights outwardly away from the shaft, the collar 53 will be moved to the left on the shaft 44 and thus automatically tilts the lever arrangement to the left in clockwise relation relative to the pivot 58.

The means for making the necessary electrical connections whenever the speed limit has been exceeded are shown in the upper portion of FIG. 6 and includes flexible fingers 62 which carry contacts 63. Fingers 62 are secured as at 64 to a lateral flange portion 65 suitably secured to the two lever arm members 57, so that the fingers 62 are tiltable in a clockwise direction with and by the tilting of the arm structure 57. A conductor 80 is in electrical connection with the fingers 62. Conductor 80 makes contact between fingers 62 and the point A in the circuit diagram of FIG. 7. When the predetermined speed for which the governor structure is adjusted and contacts 69 are adjusted is attained, contacts 63 engage contacts 69 to complete the electrical circuit in FIG. 7 between point A and points B and C by means of wires 81 and 82.

Contacts 69 are supported by flange 68 which in turn is adjustably supported by bracket 66 through lockscrew 67. Thus the speed limit is set by the parent by adjusting the height of flange 68 by means of lockscrew 67 which determines the automobile speed at which contacts 63 will touch contacts 69. Access to lockscrew 67 is through panel 73 which is attached to frame 83 by means of hinge 72. Access to the speed limit adjustment is controlled by key 74.

Figure 7:
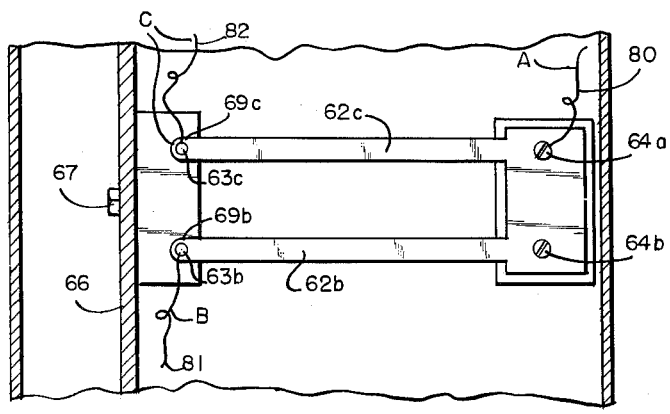
FIG. 7 is a view in elevation of the switch contacts of the speed violation detector used in the second form of the invention.

In FIG. 7 it can be seen that 62 FIG. 6 consists of two separate fingers 62b and 62c which separately make contact with contacts 69b and 69c in order to connect points B and C in FIG. 7 to point A whenever the set speed limit is exceeded.

Figure 8:
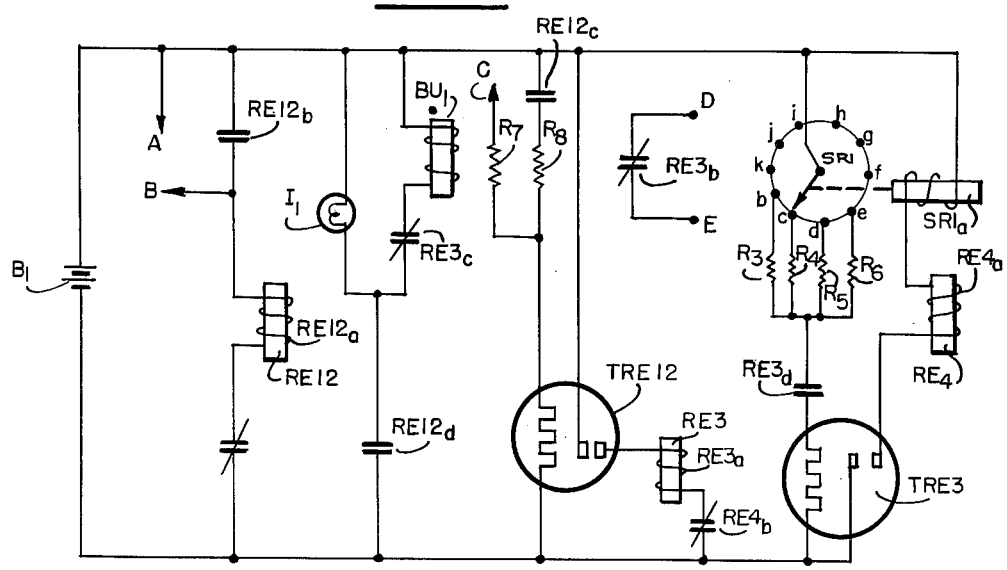
FIG. 8 is an electrical circuit diagram of the second form of the invention.
Figure 9:
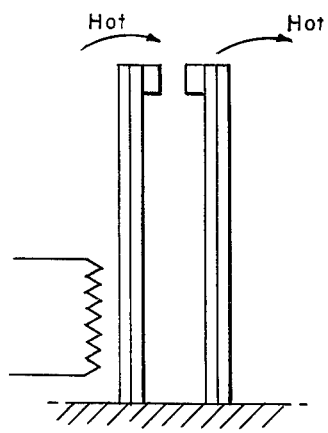
FIG. 9 is a detail view of one form that the thermal switches may take and the details thereof are not essential to the invention.
Figure 10:
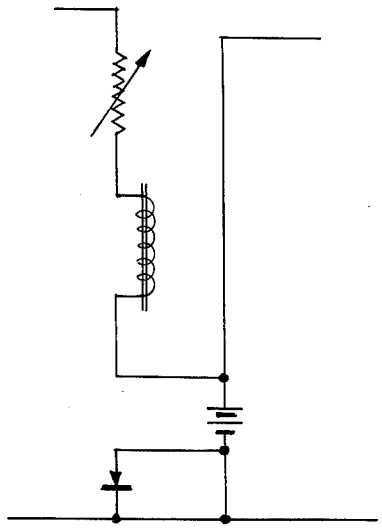
FIG. 10 is an alternate arrangement for certain parts of FIG. 4.

With reference to FIG. 8, it can be seen that with the electrical connection of point B to point A current will pass from the automobile battery B1 through relay coil RE12a. This will cause relay RE12 to operate, closing contacts RE12b and RE12c. The closing of contacts RE12b provides a current path for keeping relay RE12 energized until the end of the punishment cycle. The closing of contacts RE12c provides a current path through resistor R8 and thermal relay TRE12. After the speed violation has occurred, a fixed amount of current will flow through TRE12 via this path. During the time interval that it would take for this current to cause TRE12 to operate, there will be additional current through TRE12 whenever additional violation of the speed limit occurs. This additional current will be through contacts 63c, 69c, FIG. 7, and resistor R7, FIG. 8. This additional current will cause TRE12 to operate sooner than it would if the speed limit is observed after the warning system 13 is actuated. Thus it can be seen that resistor R7 and contacts 63c and 69c comprise the time interval shortener 114 in FIG. 5. A suitable value for resistor R8 may be selected so that some speeding after the warning signal is required to shut off the engine. When thermal relay TRE12 has been heated a sufficient amount it energizes relay RE3, the contacts RE3b of which open the ignition circuit of the car. Thermal relay TRE12 comprises the time measuring device 15, FIG. 5. The remaining components in FIG. 8 have the same designations as their counterparts in FIG. 4 and they operate in the same manner as was described for the first form of the invention.

The word "signal" as used herein is defined broadly to include any form of warning (visual, audible, etc.), the passage of electrical current through a wire, anything that interferes with the normal operation of the automobile, or any force which operates on or controls any part of the system or of the automobile.

What we claim is:

1. In an automotive speed signaling system, means responsive to an excessive automobile speed, for producing a first signal, means set into action by the first signal for producing a second signal in a time interval after the first signal including means for varying said time interval in inverse relation to the automobile speed, means actuated by the first signal for producing a third signal after a predetermined interval irrespective of automobile speed, and signaling means responsive to whichever of the second or third signals occurs first.

2. An automotive speed signaling system as defined in claim 1 in which said signaling means stops the automobile in response to the first to occur of said second and third signals.

3. In an automotive signaling system, means responsive to excessive automobile speed for giving a first signal and for warning the driver of the automobile, automobile control means having a delay device actuated by the first signal for producing a second signal at a later time, said automobile control means including means that in response to the second signal stops the automobile for a limited time, and a second delay device actuated by the second signal for restoring the first delay device to normal after a period of time.

4. In an automotive signaling system as defined in claim 2, additional means for increasing the period of delay of the second delay device in response to a later speed violation indication.

5. In an automotive control system, means responsive to excessive automobile speed for giving a warning to the driver, first delay means controlled by the first-named means for stopping the automobile after a time interval following said warning signal, and second delay means controlled by the first delay means for enabling the automobile to be started after a further time interval.

6. An automotive control system as defined in claim 5 having additional means controlled by the first-named means for reducing said first-named time interval if the automobile continues at an excessive speed after said warning indication.

7. In an automotive control system, means responsive to excessive automobile speed for giving a warning to the driver, and delay means for stopping the car after a time interval following said warning, said delay means including means for determining the length of said time interval and effecting a time interval that is inversely related to the amount of overspeeding.

8. In an automotive control system, means for stopping the automobile in response to excessive speed, delay means for restoring the automobile to normal operating condition after a time interval whereby the driver is again free to operate at excessive speed and thus cause a second operation of the first-named means as well as of the delay means, and means for enlarging said time interval in response to such second operation of the first-named means.

9. In an automotive control system, means for warning the driver if the automobile operates at excessive speed, and delay means actuated by the first-named means for giving a signal after a time period following said warning, and second delay means for cancelling the signal in a first time interval after one excessive speed operation and in a longer time interval after a subsequent excessive speed operation.

10. An automotive control system as defined in claim 9 including means for reducing said time period if the automobile continues at excessive speed following said warning.

11. An automotive control system comprising means for giving a warning to the driver of excessive speed and producing an electrical signal, delay means energized by the signal from the first-named means for stopping the automobile after said warning, said delay means including means to provide for a delay in inverse relation to the degree of its energization, and means responsive to excess automobile speed for increasing the energization of said delay means to thus reduce the entire time period after which the automobile is stopped following said warning.

12. An automotive signaling system comprising means for giving a first electrical signal warning the driver in response to speed conditions of the automobile, electrical delay means for giving a second signal warning the driver following the first signal, and means responsive to automobile speed during the period between said signals for varying the period of operation of the second-named means.

13. An automotive speed signaling system for use on an automobile having an ignition circuit, a first relay having a coil, means for energizing said relay coil in response to excessive speed, a delay device actuated by said first relay when the latter is energized, a second relay having a coil energized by the delay device in a period of time after said actuation thereof for opening the ignition circuit of the automobile, a second delay device actuated by said second relay when the coil of the latter is energized, and a third relay having a coil energized by the second delay device for deenergizing the coil of the second relay after the second delay device has operated.

14. In an automotive control system, means operable in response to excessive automobile speed to give a warning to the driver and to thereafter automatically stop the automobile, and means for restoring the first-named means to normal after a period of delay to permit operation of the automobile, and means to determine said period of delay in relation to the number of times the first-named means stops the automobile.

15. In an automotive control system, means operable in response to excessive automobile speed to first give the driver a warning and after a period of time stop the automobile and after a second period of time restore the automobile to normal operating condition, and means for varying at least one of said time periods according to the extent of excessive speed operation of the automobile.

16. An automotive control system comprising speed responsive means for warning the driver of excessive speed and thereafter stopping the automobile in a first time period if the automobile slows to a permissible speed and in a second shorter time period if the automobile continues at excessive speed, and means which restores the automobile to normal operating condition after a further time period.

17. In an automotive control system, means which in its normal state does not give a first signal but is operable in response to excessive automobile speed to give a first signal in the form of a warning to the driver and to thereafter give a second signal, means for restoring the first-named means to normal after a further period of delay, and means to determine said further period of delay in relation to the number of times that the warning is given to the driver.

18. In an automotive control system, means which in its normal state does not give a warning signal but is operable in response to excessive automobile speed to first give the driver a signal constituting a warning and after a period of time give a second signal, means operating after a further and second period of time to restore the first-named means to normal operating condition, and means for varying at least one of said time periods according to the extent of excessive speed operation of the automobile.

19. An automotive control system comprising speed responsive means, which in its normal state does not give a warning signal, for warning the driver of excessive speed and thereafter giving a signal in a first time period, if the automobile slows to a permissible speed and in a second shorter time period if the automobile continues at excessive speed, and means which restores the first-named means to normal operating condition after a further period of time.

References Cited by the Examiner

UNITED STATES PATENTS

| 1,453,368 | 5/23 | Teyes | 180—82.1 |
| 1,453,369 | 5/23 | Teyes | 180—82.1 |
| 1,569,223 | 1/26 | Gore | 180—82.1 |
| 1,938,679 | 12/33 | Anderson | 340—53 |
| 2,640,979 | 6/53 | Carter | 180—53 X |
| 2,837,168 | 6/58 | Sabater | 180—82.1 |

A. HARRY LEVY, *Primary Examiner.*